United States Patent
De La Rocha Gómez-Arevalillo et al.

(10) Patent No.: US 11,637,711 B2
(45) Date of Patent: Apr. 25, 2023

(54) METHOD AND SYSTEM FOR DLT NETWORKS CONSENSUS ENHANCEMENT USING QUANTUM COMPUTING MECHANISMS

(71) Applicant: Telefónica IoT & Big Data Tech, S.A., Madrid (ES)

(72) Inventors: Alfonso De La Rocha Gómez-Arevalillo, Madrid (ES); José Luis Nuñez Díaz, Madrid (ES)

(73) Assignee: Telefónica IoT & Big Data Tech, S.A., Madrid (ES)

(*) Notice: Subject to any disclaimer, the term of this patent is extended or adjusted under 35 U.S.C. 154(b) by 317 days.

(21) Appl. No.: 17/076,837

(22) Filed: Oct. 22, 2020

(65) Prior Publication Data

US 2021/0126800 A1 Apr. 29, 2021

(30) Foreign Application Priority Data

Oct. 25, 2019 (EP) .................................. 19382928.0

(51) Int. Cl.
| | | |
|---|---|---|
| H04L 29/06 | (2006.01) | |
| H04L 9/32 | (2006.01) | |
| G06F 16/27 | (2019.01) | |
| G06N 10/00 | (2022.01) | |
| G06F 11/10 | (2006.01) | |
| H04L 9/40 | (2022.01) | |
| H04L 9/00 | (2022.01) | |

(52) U.S. Cl.
CPC ............ *H04L 9/3268* (2013.01); *G06F 11/10* (2013.01); *G06F 16/27* (2019.01); *G06N 10/00* (2019.01); *H04L 63/0823* (2013.01); *H04L 9/50* (2022.05)

(58) Field of Classification Search
CPC ..... H04L 9/3268; H04L 63/0823; H04L 9/50; H04L 9/0852; H04L 9/3239; H04L 9/3236; G06F 11/10; G06F 16/27; G06N 10/00
See application file for complete search history.

(56) References Cited

U.S. PATENT DOCUMENTS

| | | | |
|---|---|---|---|
| 11,477,015 B1* | 10/2022 | Smith | G06N 10/00 |
| 2017/0221032 A1* | 8/2017 | Mazed | G06Q 30/0639 |
| 2019/0311296 A1* | 10/2019 | Fan | H04L 9/50 |
| 2020/0410404 A1* | 12/2020 | Imani | H04L 9/085 |

FOREIGN PATENT DOCUMENTS

CN 110602077 * 12/2019

OTHER PUBLICATIONS

Rajan el al., "Quantum Blockchain Using Entanglement in Time" Feb. 26, 2019, Quantum Rep. 2019, 1(1), 3-11; https://doi.org/10.3390/quantum1010002, School of Mathematics and Statistics, Victoria University of Wellington, PO Box 600, Wellington 6140, New Zealand, p. 9-9 (Year: 2019).*

European Search Report dated Apr. 17, 2020 From the European Patent Office Re. Application No. EP19382928. (2 Pages).

Li et al. "Deterministic Quantum Secure Direct Communication Protocol Based on Hype-Entangled State", IEEE Access, 7, XP11718864A, : 43948-43955, Mar. 29, 2019.

\* cited by examiner

*Primary Examiner* — Harunur Rashid

(57) ABSTRACT

Method and system which provides an increase in the basic security, performance, and trust of consensus algorithms in distributed systems based on the use of quantum technology (quantum computing mechanisms). In order to do that, it is built a quantum trust network layer using quantum entanglement between nodes to avoid the current problems in consensus algorithms.

13 Claims, 5 Drawing Sheets

METHOD AND SYSTEM FOR DLT NETWORKS CONSENSUS ENHANCEMENT USING QUANTUM COMPUTING MECHANISMS

RELATED APPLICATION

This application claims the benefit of priority of European Patent Application No. 19382928.0 filed on Oct. 25, 2019, the contents of which are incorporated herein by reference in their entirety.

FIELD AND BACKGROUND OF THE INVENTION

The present invention relates to DLT (Distributed Ledger Technology) networks and more particularly, to a method and system to leverage the level of trust, security and performance offered in DLT networks (for example, in networks using blockchain technology), using quantum communication (or generally speaking quantum computing mechanisms or quantum technology).

A distributed ledger (also called a shared ledger or distributed ledger technology, DLT) imply a consensus of replicated, shared a synchronized digital data across multiple nodes. There is no central administrator or centralized data storage. The distributed ledger database is spread across several nodes (devices) on a peer-to-peer network, where each replicates and saves an identical copy of the ledger (data) and updates itself independently. When a ledger update happens, each node constructs the new transaction, and then the nodes vote by consensus algorithm on which copy is correct. Once a consensus has been determined, all the other nodes update themselves with the new, correct copy of the ledger (security is accomplished through cryptographic keys and signatures). The participant nodes (devices) of a distributed ledger may apply an agreed protocol for verifying, storing, maintaining and modifying data stored in the distributed ledger. One form of distributed ledger design is the blockchain system; that is, it can be said that the blockchain technology is a type of DLT.

Consensus algorithms are one of the core components of blockchain systems (and generally speaking of DLT systems). It is the piece responsible for the orchestration of transactions, and the synchronization and validation of data in the network. For the last decade, a great gamut of consensus algorithms has been designed. However, these consensus algorithms present several limitations, and their design is always a trade-off between level of decentralization, security and performance. Some of said current consensus algorithms are:

Proof-of-work: In proof of work, miners compete to add the next block in the chain by racing to solve an extremely difficult cryptographic puzzle. It has been shown secure for ten years in Bitcoin. However, it has two main drawbacks: its throughput is pretty low, and the amount of computational energy required for mining is outstanding, not being, thus, suitable for medium to high throughput solutions or high-performance/efficiency-focused products.

Proof-of-stake: In this type of consensus algorithms, instead of investing in expensive computer equipment in a race to mine blocks, a 'validator' invests in coins of the system. In proof of stake, your chance of being picked to create the next block depends on the fraction of coins in the system you own (or set aside for staking). A validator with 300 coins will be three times as likely to be chosen as someone with 100 coins. This consensus is more energy efficient and, the fact that miners do not have to solve a hard puzzle, allow higher throughputs. However, as every node in the network is a potential validator, we can face the 'nothing-at-stake' problem, where nodes force forks in the ledger to earn double in the validation process. Hence, this consensus algorithm improves the throughput of proof-of-work at the expense its level of security and trust.

Proof-of-authority: In proof-of-authority a set of trusted nodes in the networks are chosen as validators. Only validators are entitled to validate the next block, and this validator is chosen randomly in a way that the same validator cannot validate two blocks consecutively. A validator node that is caught trying to forge the system is removed from the validators pool. If validators nodes are trusted, this consensus algorithm reduces the level of decentralization increasing its throughput compared to other consensus algorithms.

Proof-of-elapsed time: Instead of forcing participants to solve a cryptographic puzzle, the algorithm uses a trusted execution environment (TEE) in its node—such as Intel's SGX—to ensure blocks are produced in a random lottery fashion, but without the required work. Thus, every participant is equally likely of being selected for the proposal of the next block according to a random timeout chosen in each node. The level of decentralization and performance of this consensus algorithm is very high; however, all the trust is delegated to the implementation of the TEE and its random number generation, and nodes have no way of verifying that these mechanisms has been forged.

Fast Probabilistic Consensus: In each round every node selects a new random subset of other nodes and queries their current opinions. A node's opinion is then formed according to the majority of returned opinions. However, the notion of "majority" here fluctuates. Instead of using a fixed threshold of 50%, we use a decision threshold derived from a decentralized random number sequence. Selecting a global but unpredictable threshold allows us to defend against an attacker that wants to delay consensus.

All of the aforementioned algorithms are implemented over different P2P transport protocols with their corresponding transmission delays. These delays imply an additional limitation for consensus algorithms performance, as the maximum transaction throughput for any consensus algorithm will be determined by the minimum transmission times of validation messages between nodes. Actually, one of the main performance bottlenecks of DLT systems is the delay in the transmission of messages during the validation process, and the time required to achieve data finality (i.e. moment when the execution and storage of data can be considered as final).

In order to solve (or at least minimize) the limitations of these current consensus algorithms, the present embodiments propose the use of a quantum communication (or generally speaking quantum computing mechanisms) to enhance the security, trust and performance of and, generally speaking, of DLT networks (e.g. blockchain technology).

Quantum computing and quantum information leverage the use of quantum mechanical effects for their operation. Some of the core concepts and quantum effects used in these fields are the following:

Qubit: In classical computing, information is represented using bits. Bits always exist in one of two states, 1 or 0. In quantum computing and quantum information, on the other hand, information is represented using qubits (or quantum bits). Qubits are two-state mechanical systems. The system is allowed to exist in a coherent superposition of both states simultaneously, feature exploited in quantum information and computing systems.

The two states of a classical bit are obtained physically, for instance, using two different voltage levels. For qubit states, on the other hand, examples of the physical two-level quantum mechanical systems used are: the spin of the electron in which the two level can be taken as spin up and spin down; or the polarization of a single photon in which the two states can be taken to be the vertical and horizontal polarization.

Mathematically, a single qubit state is described through a linear combination of the pure state 0 (e.g. electron's spin down) and 1 (spin up) as such:

$$|\psi\rangle = \alpha|0\rangle + \beta|1\rangle$$

Where $\alpha$ and $\beta$ are probability amplitudes and can, in general, be complex numbers. Thus, this single qubit state sits in a superposition of 0 and 1 with probability determined by $\alpha$ and $\beta$. To be in superposition means that the physical system is a combination of all its possible states. A qubit is in this superposition state until it is measured. When measured, the superposition collapses to one of the two basis elements (0 or 1) with probability $|\alpha|^2$ for 0 and $|\beta|^2$ for 1. Measurements are irreversible operations in which information is gained, so a measurement cannot be directly reverted to obtain the previous coherent superposition state.

Quantum logic gates: Operations may be performed over qubit states to modify them. This is done using quantum logic gates, the basic building block of quantum circuits. Quantum gates operate on one, two or three qubits, and they perform a reversible unitary transformation. One interesting quantum gate which operates over two qubits is the Controlled NOT (C-Not) gate that can be used to entangle or disentangle qubits.

Quantum Entanglement: An important feature of qubits compared with classical bits is that they can exhibit quantum entanglement. Quantum entanglement is a non-local property of two or more qubits that allows a set of qubits to express higher correlation than is possible in classical systems. The simplest entangled state is the two entangled qubit Bell state:

$$\frac{1}{\sqrt{2}}(|00\rangle + |11\rangle).$$

This state is called an "equal superposition", and there is an equal probability of measuring either the state 00 or 11. There is no way to know if the first qubit is going to be 0 or 1. Nonetheless, due to the quantum entanglement between the first and the second qubit, we know that if the first qubit ends up being a 1 after measurement, the second qubit must necessarily be also a 1, and the other way around if the first qubit is 0. This property is very interesting, because it sticks even if the two qubits are distant in space. Thus, if Alice and Bob share one qubit of a two-qubit entangled state, whenever any of them measures its qubit, they know the other's result must have led to the same value, i.e. there is perfect correlation between the two entangled qubits.

Quantum entanglement can be physically created using different techniques: it can be created using "parametric down-conversion" sources which use non-linear optical crystals to convert single high-energy photons into pairs of photons with half the initial energy entangled; using second-generation entanglement, in which a pair of entangled photons are directed to a pair of atoms in order to obtain a more long-living entanglement; or using "entanglement by interaction" in which two atoms of different elements are forced to interact in order for them to become entangled, so the state of the first atom depends on the state of the second one, and vice versa.

Inside the field of quantum computing, a current active field of research is quantum error correction. Current quantum error correction algorithms are focused on the detection and correction of bit and phase flips in noisy quantum channels and computers. Typical error correction schemes are based on a set of logical qubits (states) which represent the data to be transmitted, which are coded with redundancy on a set of physical qubits. Additionally, a set of ancilla qubits related to the aforementioned physical qubits (states) are used to detect and correct potential errors.

Summarizing, the design and implementation of better consensus algorithms for blockchain and distributed networks, and overcoming their performance limitations, are active fields of research. The design of current consensus algorithms is a trade-off between level of decentralization, security and performance. Consensus algorithms such as Bitcoin's proof-of-work have been shown to be really secure and decentralized at the expense of performance and sustainability. Other algorithms such as proof-of-stake or proof-of-authority have been shown relatively performance-efficient and secure in trusted environments at the expense of decentralization. Adding to this, every consensus algorithm is limited by the minimum delay in the exchange of validation messages and blocks between nodes of the network. These same problems are faced in traditional consensus algorithm for distributed system such as RAFT or Paxos. Hence, current consensus algorithms lack of a way of offering security, trust, decentralization, performance and security at the same time in trust-less environments (such as distributed and blockchain networks).

The proposed invention aims to give a basic mechanism of security, trust and enhanced performance for consensus algorithms to prevent nodes from being able to forge the consensus and "lie" to other nodes enabling the design of improved consensus algorithms with high performance, security and decentralization at the same time. This same security mechanism can be used for the trusted exchange of public validation data between nodes in a distributed (DLT) system through a quantum channel. The use of the proposed quantum-computing mechanisms aims to offer a basic layer of enhanced trust, security and performance to enable the implementation of improved consensus algorithms where the typical design and implementation trade-offs between security, performance and decentralization are removed.

SUMMARY OF THE INVENTION

The problems found in prior art techniques are generally solved or circumvented, and technical advantages are generally achieved, by the disclosed embodiments which provide a method and system which provides an increase in the basic security, performance, and trust of consensus algorithms and distributed systems based on the use of quantum information (quantum computing mechanisms).

In order to do that, the proposed embodiments build an independent quantum trust network layer (or simpler, quantum trust layer) based, on quantum communication, that leverages the use of quantum entanglement between nodes to remove these trade-offs in consensus algorithms. In every block/data validation round in a distributed network (a DLT network), there is a pass of data messages between nodes to determine the node entitled to seal the next block or accept the data. To ensure that the consensus-related messages hasn't been counterfeit, and that they are transmitted instantly, these data qubits are entangled with qubits of other nodes of the network so that when the data qubits are conveniently measured, the corresponding entangled (redundancy) qubits also collapse, allowing the detection of data forgery in the communication. Thus, the data qubits of every node in the network are linked to the ones of other nodes of the network preventing the falsification of information and ensuring a high-performant Byzantine Fault Tolerant (BFT) basic level of security. For its operation, the proposed embodiments may use a combination of quantum transmission channels (based on the entanglement between qubits of different nodes), and a classical channel like any other computational communication system.

The proposed quantum communication architecture can be used to enhance current consensus algorithms, implement new ones, or create public and trusted quantum channels of communication between nodes in a distributed network (DLT network). It enables the connection of any consensus algorithm over this quantum network to leverage its benefits, as well as the implementation of complete blockchain or generally speaking DLT networks, over it.

According to a first aspect, it is proposed a method for enhancing consensus between a group of computing nodes belonging to the same Distributed Ledger Technology (DLT) network or to different DLT networks, the nodes being connected by a telecommunications network (formed by one or more telecommunications sub-networks), the method comprising the following steps:

a) A computing node requesting a validation round (e.g. through a channel of the telecommunications network) for b data bits;

b) When the validation round is requested, every computing node of the group obtaining quantum bits, data qubits, corresponding to the b data bits to be validated in the validation round (where b is any number of bits and it is a design option);

c) Every computing node of the group, entangling its data qubits with one or more other computing nodes of the group, according to a quantum error correction scheme, and afterwards validating the data bits based on the entangled data qubits measured from one or more other computing nodes of the group (according to the quantum error correction scheme).

In an embodiment, step c) comprises:
Every computing node of the group, obtaining a sequence of qubits entangled with data or ancilla qubits of other computing nodes, counterpart nodes, according to the quantum error correction scheme, and sharing the sequence of entangled qubits with its counterpart nodes;
Every computing node of the group, measuring the sequences of entangled qubits to obtain the corresponding bits and sending a reception certificate, including the measured bits together with the computing node data bits to be validated, to the rest of computing nodes of the group using one or more telecommunications network channels;

When receiving the reception certificates, every computing node of the group, validating the data bits according to the quantum correction scheme based on the information received on the reception certificates;
If any of the validations is negative, considering the validated data (included in the received certificate) as forged.

The quantum error correction scheme used may be a 3-qubit error-correction scheme.

In an embodiment, step c) comprises:
Assigning each computing node of the group to a shard, being N (usually N>1) the total number of shards (where each shard is assigned with a certain number of computing nodes);
Every computing node ($A_n$) of each shard n, n=1 ... N, preparing the following groups of entangled qubits:
  a first redundancy group of b qubits entangled with the data qubits of a computing node ($B_n$) of the same shard n,
  a second redundancy group of b qubits entangled with the data qubits of another computing node ($C_n$) of the same shard n, and
  a group of 2b ancilla qubits entangled with the ancilla qubits of a computing node $A_{n+1}$ belonging to a different shard;
(this will be done for all the nodes of the shard, so it will be done also for $B_n$ with $A_n$, $C_n$ and $B_{n+1}$ and for $C_n$ with $A_n$ and $B_n$ and $C_{n+1}$)
Sharing the sequence of entangled qubits ($\{r_{AnBn}\}\{r_{AnCn}\}\{a_{AnA(n+1)}\}$) with its counterpart nodes ($B_n$, $C_n$ and $A_{n+1}$ respectively);
Every computing node of each shard, measuring the sequences of entangled qubits to obtain the bits corresponding to each qubit;
Every computing node of each shard, building a reception certificate which includes the b computing node data bits to be validated, $dA_n$, the bits corresponding to the measurement of the a first redundancy group of b qubits $\{r_{AnBn}\}$, the bits corresponding to the measurement of the second redundancy group of b qubits $\{r_{AnCn}\}$ and the bits corresponding to the measurement of the group of 2b ancilla qubits $\{a_{AnA(n+1)}\}$;
Every computing node of each shard, sending said reception certificate to the rest of computing nodes of the group through one or more channels of the telecommunication network;
Every computing node of each shard, validating the b computing node data bits $dA_n$ from the information in the received reception certificates, and if any of the validations is negative, considering the data to be validated as forged.

The validation of the computing node data bits, $dA_n$, in every computing node $A_n$ may be considered positive if:

$$d_{An} == r_{(\ldots)An} == a_{(\ldots)An\{1\ldots b\}} == a_{(\ldots)An\{b+1\ldots 2b\}}$$

being $r_{(\ldots)An}$, the redundancy bits received from its corresponding counterpart computing nodes from the same shard n ($B_n$, $C_n$) and being $a_{(\ldots)An(1\ldots b)}$ the first b bits, and $a_{(\ldots)An\{b+1\ldots 2b\}}$ the last b bits of the ancilla bits received form its counterpart node from other shard ($A_{n+1}$).

In an embodiment, the number of shards will be (the whole part of) N/3 and every shard has a minimum of three computing nodes assigned.

The assignment of computing nodes to shards may be based in an identification number of each computing node.

For example, the computing nodes in each shard may be the computing nodes with smaller distance between their identification numbers.

In an embodiment, the method further comprises:
If all the validations are positive, selecting in each computing node one of the validated data to update a corresponding ledger; otherwise, considering the data as forged and aborting the validation round (notifying the rest of the nodes of the group) or, from the information received in the reception certificates, correcting the forgery and recovering the data.

The reception certificates are usually signed by the computing node building the reception certificate and the validation is performed, only if the integrity and authenticity of the reception certificate is checked through the reception certificate signature.

In an embodiment, to improve security, the validation step is performed by a computing node only if it has received a reception certificate from all the computing nodes of the group.

In an embodiment, the b data bits to be validated include the following fields:

[SEQ|RANDOM NUMBER|DATA]

where SEQ is a sequence number that identifies the validation round for which the data is exchanged, RANDOM NUMBER is a random number used to determine the next computing node entitled to propose the next data to be validated and DATA is the specific information about which consensus is to be established between the computing nodes of the group.

The datagram may also include an identification field, ID, (for example, at the beginning of the datagram) where said identification field used to identify the specific consensus algorithm or blockchain platform to whom the data exchanged belongs. The SEQ number may for example be equal the hash of the chosen reception certificate of the previously validated round.

The entanglement between qubits may be made using "parametric down-conversion" sources of photons or using any other known technique.

According to a second aspect, it is proposed systems for implementing any of the methods previously disclosed. Particularly, it is proposed a system for enhancing consensus between computing nodes, the system comprising a group of computing nodes belonging to the same or different Distributed Ledger Technology, DLT, networks connected by a telecommunications network, every computing node comprising:
Means for requesting a validation round sending a message through the telecommunications network;
Means for, when a validation round has been requested (by the node itself or by another node) obtaining the quantum bits, data qubits, corresponding to the b data bits to be validated in the validation round;
Means for entangling its data qubits with one or more computing nodes of the group, following a quantum error correction scheme and
A processor configured to validate the b computing node data bits using the quantum error correction scheme based on the entangled data qubits from one or more other computing nodes of the group, according to the quantum error correction scheme.

In an embodiment, the computing nodes of the system further comprises:
Means for obtaining a sequence of entangled qubits by entangling qubits with data or ancilla qubits of other computing nodes, counterpart nodes, according to the quantum error correction scheme;
Means for measuring the entangled qubits to obtain the corresponding bits;
Means for sending a reception certificate, including the measured bits together with the computing node data bits to be validated, to the rest of computing nodes of the group using one or more telecommunications network channels;
Means for receiving reception certificates from the rest of computing nodes of the group,
The processor being configured to validate the b data bits according the certain quantum correction scheme based on the information received on the reception certificates and, if any of the validations is negative, to classify the validated data as forged.

In a last aspect of the present invention, a computer program is disclosed, comprising computer program code means adapted to perform the steps of the described methods, when said program is run on processing means of a network entity of an OFDMA network, said processing means being for example a computer, a digital signal processor, a field-programmable gate array (FPGA), an application-specific integrated circuit (ASIC), a micro-processor, a micro-controller, or any other form of programmable hardware. In other words, a computer program comprising instructions, causing a computer executing the program to perform all steps of the described method, when the program is run on a computer. A digital data storage medium is also provided for storing a computer program comprising instructions, causing a computer executing the program to perform all steps of the disclosed methods when the program is run on a computer.

Consequently, according to the invention, a method, system and storage medium according to the independent claims are provided. Favourable embodiments are defined in the dependent claims.

The proposed solution therefore implies, among others, the following advantages over the prior art solutions:
It enables the secure exchange of validation data with immediate effect between nodes ensuring that data wasn't forged.
It combines the use of a quantum communication channel and a classical channel so it can be easily integrated in existing systems and networks.
The consensus scheme proposed minimizes the number of messages to be exchanged between nodes and their bandwidth requirements, offering a high-performant basic security layer for consensus algorithms and distributed networks.

These and other aspects and advantages of the invention will be apparent from and elucidated with reference to the embodiments described hereinafter.

BRIEF DESCRIPTION OF THE SEVERAL VIEWS OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF SPECIFIC EMBODIMENTS OF THE INVENTION

The present inventions may be embodied in other specific system and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The present invention purposes the implementation of a quantum network layer (called from now on, quantum trust ring) between different nodes underlaying different DLT (e.g. blockchain) networks, consensus algorithms, and distributed systems to offer them an enhanced basic level of security, trust and performance.

Each DLT network comprises one or more (usually many of them) nodes (computing nodes); the computing nodes are electronic devices of any type (for example, servers) including databases storage capacity (memory) and processing capacity (processor).

Figure 1:
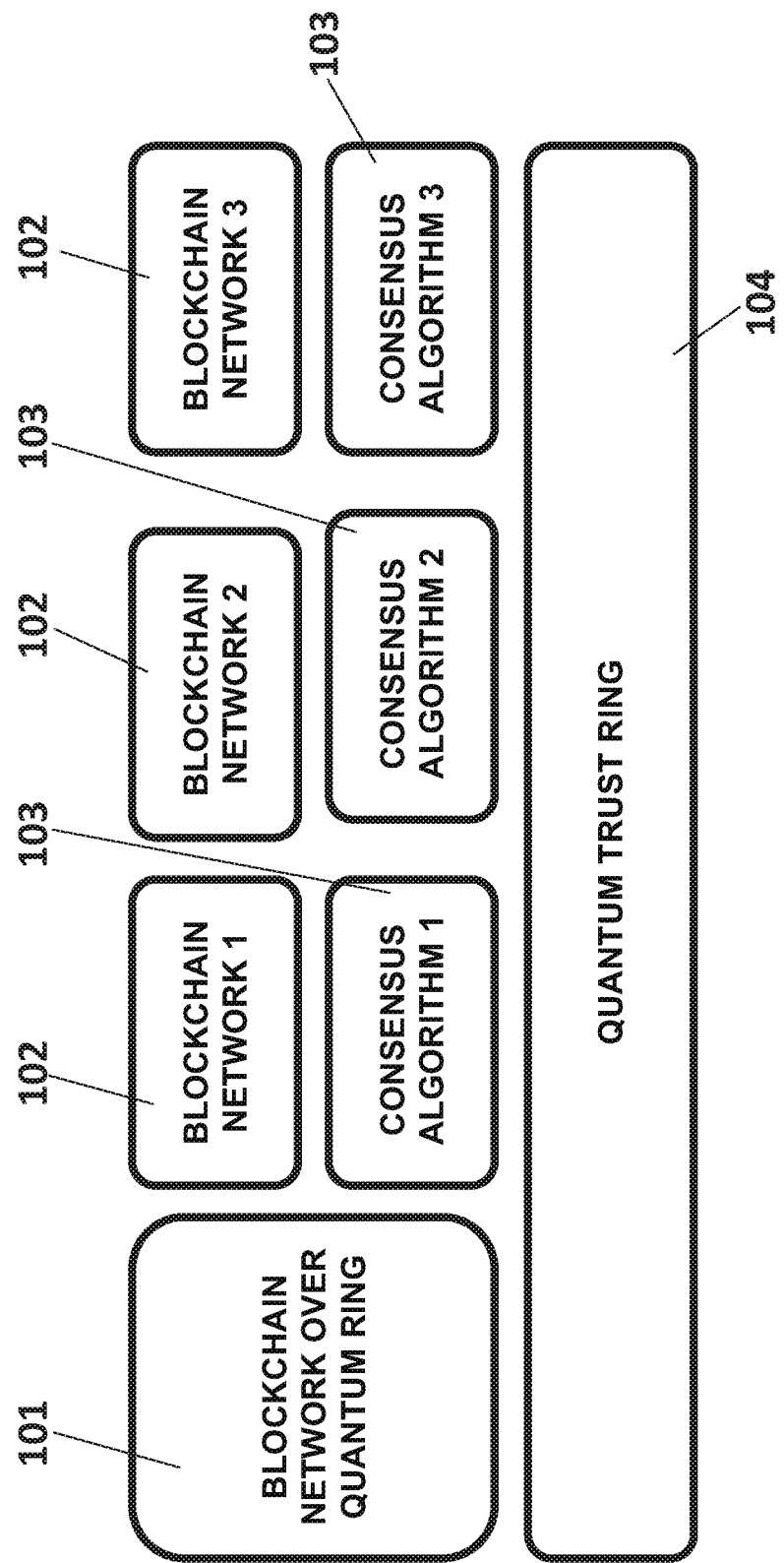
FIG. 1 shows a schematic diagram of a possible system architecture according to one embodiment in the invention.

Thus, brand new distributed systems (101) could be directly implemented over the quantum trust ring, leveraging the consensus offered by the quantum ring for their basic operation; or existing DLT systems (102) with their own consensus algorithms (103) could leverage the quantum trust ring (104) as an additional transport channel for enhanced performance and security in their consensus (see for example FIG. 1).

The quantum trust ring employs quantum error correction algorithms to enforce the trust of data between networks. Instead of the typical use of the quantum error correction algorithms, here the quantum error correction algorithms are used in a quantum device-independent manner for nodes to instantaneously exchange data between them, enabling them to detect the forgery of data in this exchange. That is, the purpose of the quantum error correction algorithms in the proposed embodiments, is not detecting and correcting disruptions in a quantum channel or computation, but intentional modifications or measurements of data. This is why it is enough to use, for example, simple bit-flip error correction schemes and it is not explicitly required to use more advanced error-correction schemes able to detect several bit and phase-flips to enhance the basic level of security required for this invention.

Figure 2:
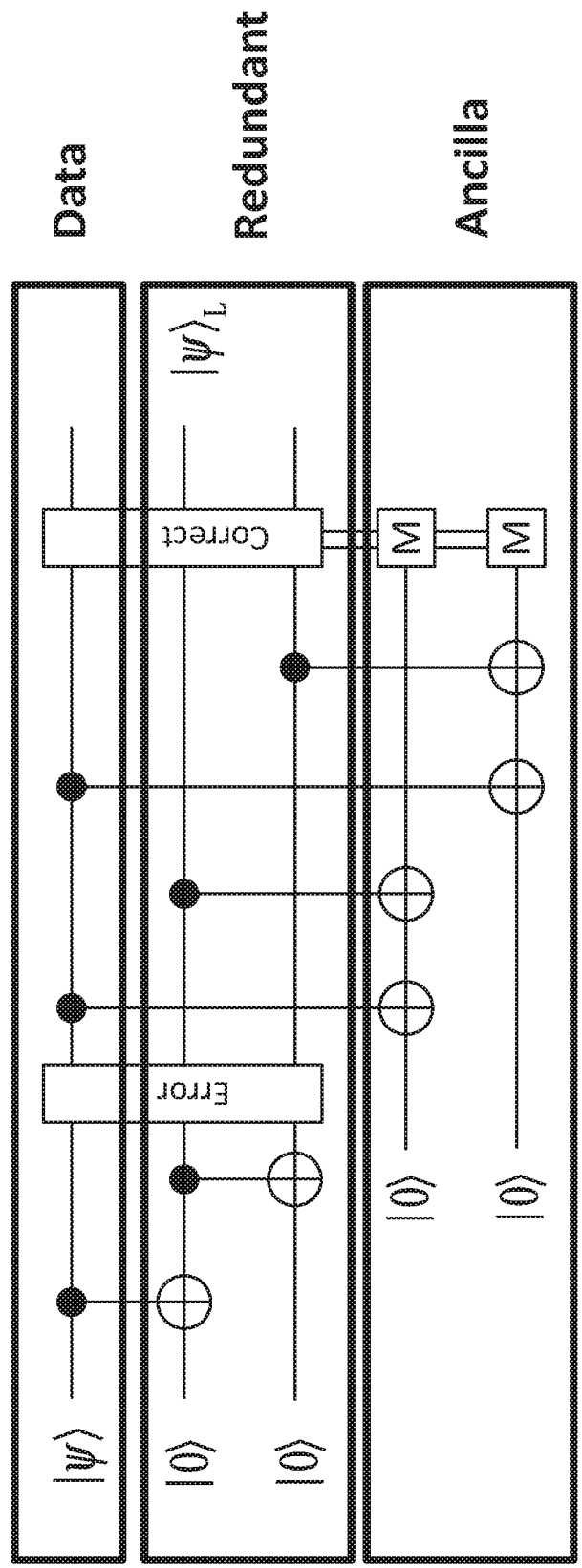
FIG. 2 shows a schematic diagram of a 3-qubit bit-flip quantum error correction scheme used in one embodiment of the invention.

As it will be later explained, an embodiment of the invention is based on a simple bit-flip quantum error correction schemes such as the 3-qubit scheme is used, schematically depicted in FIG. 2 (this is only an example and any other quantum error correction schemes can be used). In the 3-qubit scheme presented in FIG. 2 the quantum state to be transmitted (first block, "Data") is coded using two additional redundant qubits (initialized in the state |0>) per data qubit (second block, "Redundant"), entangled with two ancilla qubits (initialized in the state |0>) for error detection and correction purposes (third block, "Ancilla"). In order to do that, C-Not gates are used. This separation and relationship between qubits of the quantum error correction schemes is used in the embodiments of the invention.

In a few words, the 3-qubit scheme works as follow (FIG. 2): The first qubit is prepared to the |Ψ>, the data qubit, i.e. the data that wants to be transmitted using the scheme. Along with this data qubit, two redundant qubits are prepared in a |0> state and entangled with the data qubit. The ancilla qubits behave as parity qubits. They are initially excited in |0> and entangled to the data qubit and the two redundant ones. Thus, the three first qubits (the data qubit along with the two redundant qubits) conform the logical data qubit $\Psi_L$, protected against errors through the two ancilla qubits (i.e. parity redundancy). The three logical data qubits are sent using a channel, (typically an error-prone channel, represented in the figure through the "error box"). By measuring the two ancilla qubits (M boxes in FIG. 2), errors over the data qubit can be detected, and eventually corrected using the data measured in the ancilla bits, and the values obtained in the data qubit and the two redundancy qubits.

In the proposed embodiments, three different parts or levels (or layers) may be distinguished: the secure exchange of data (through a quantum channel), the consensus layer between nodes, and the high-level architecture of the system.

Secure Exchange of Data

To achieve the secure and instantaneous exchange of information between nodes, an entangled system between neighbouring nodes inspired on a simple quantum error correction scheme is used (for example, the 3-qubits error correction scheme previously mentioned). This scheme prevents nodes from being able to forge the information exchanged, and it is used to share the information required to reach a consensus and choose the next node entitled to validate a block in the network.

For the following explanation, a distributed network (a DLT network) with a number n of nodes is considered (without loss of generality). These nodes need to exchange b bits of trusted data between them. A basic Byzantine Fault Tolerant level of security is to be offered, i.e. the proposed embodiment must withstand at least one third of the nodes being faulty, compromised or malicious. To enforce this basic security level, nodes in the network are distributed in different shards (also called fragments or groups), entangling the data qubits of each node with nodes inside and outside their shard, following an entanglement mechanism analogous to the one followed in an error correction scheme, for example in the 3-qubit error correction scheme.

Thus, to enforce a BFT network, a network with n nodes is divided in the following number of shards:

Number of shards=$s=[n/3]$ with at least three nodes per shard (or more specifically, 3 or 4 nodes per shard). This distribution of nodes and shards in the network ensures that the proposed scheme is able to detect the action of n/3 faulty nodes in the network irrespective of the shard.

For the system to operate correctly, each node must be provided with, at least, the following number of qubits:
Number qubits per node=(1 for data+1 redundancy+2 ancilla)qubits=4 qubits To determine which nodes to encompass in each shard, in an embodiment a minimum distance algorithm is employed (however, any other algorithm or mechanism can be used to distribute the nodes among the shards). Each node is identified through an ID in bits. Consequently, in each shard the 3 (or 4) nodes with a smaller distance between them are encompassed in the same shard. The distance between two nodes A and B is computed in this embodiment (any other distance definition can be used) as:

$$d(AB) = id_A \text{ xor } id_B$$

If according to the number of shards they require more than three nodes to accommodate all the nodes in the system, a $4^{th}$ node is included in every shard, for example, from the last shard to the first one until every node is assigned a shard using the same minimum distance algorithm. In some cases, any other scheme to choose the shards with 4 nodes may be used (for example, randomly chose the shards with 4 nodes, choose from first to last node etc.). This won't affect the correct operation of the proposed solution.

Figure 3:
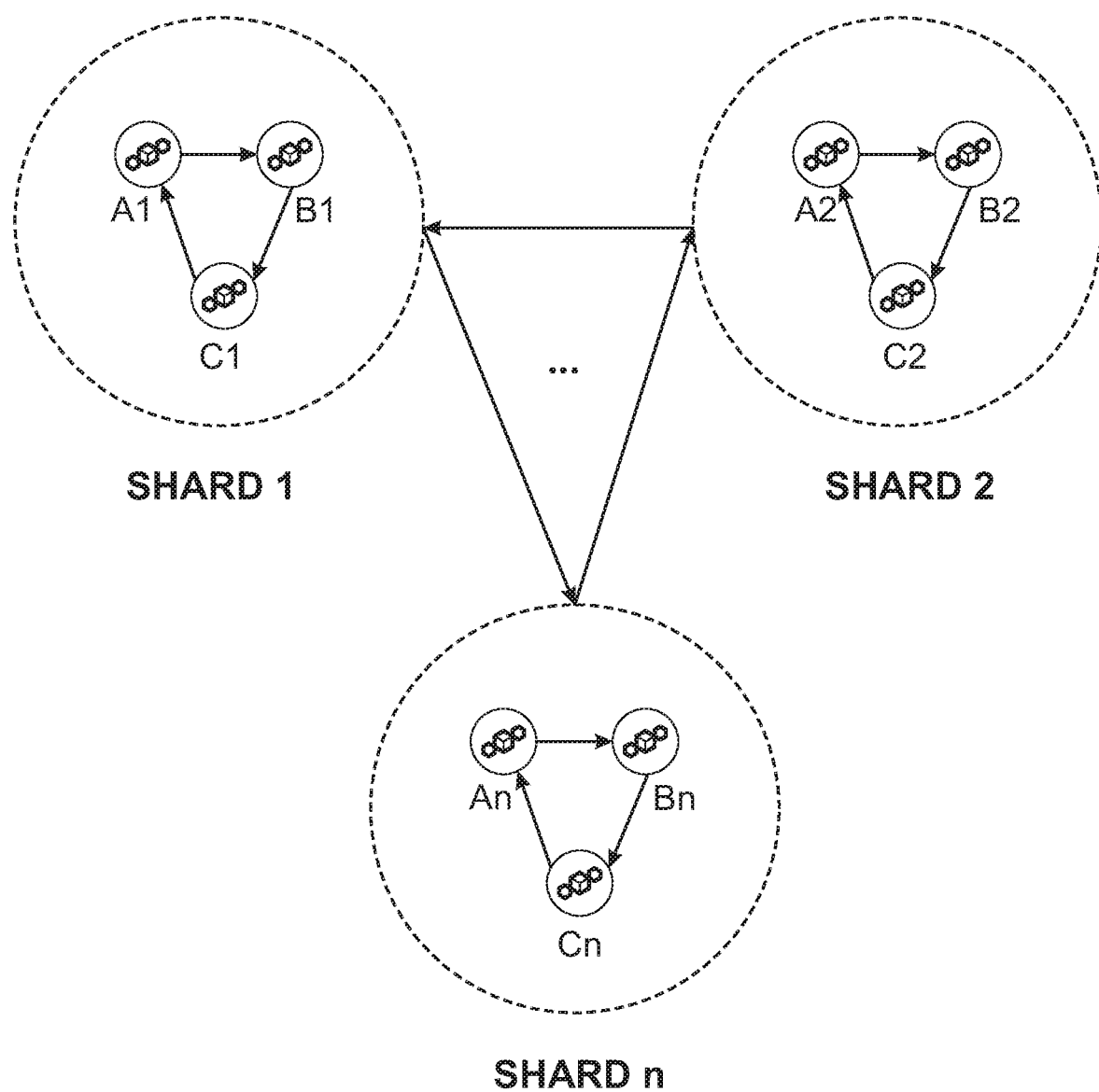
FIG. 3 shows a schematic general network architecture with the node distribution in shards according to one embodiment in the invention.

The aforementioned setup leads to the general nodes distribution (network architecture) as the one presented in FIG. 3. For clarity purposes, the notation of nodes in a shard chosen for the rest of the document is the following: each node is identified in their shard with a letter (A, B, C), and the number following the letter determines the shard the node belongs to. Thus, A1 is node A from shard 1.

Using this network architecture (node distribution) as a base, in an embodiment the entanglement procedure of data qubits between nodes is based on a structure similar to the one of a 3-qubit error-correction scheme, where the redundant qubits related to a node's data qubits are entangled to nodes inside its shard, while ancilla qubits are entangled to a node's counterparty outside its shard. This mechanism ensures that irrespective of the specific n/3 nodes that collude in the network (in the same shard, or with colluding nodes in every shard), a forgery of data from a node is detected using its entangled redundancy and ancilla qubits.

Every shard is composed of at least three nodes, and the entanglement mechanisms is as follows:

Nodes qubits are organized in the following groups: data qubits, the redundancy groups, and ancilla qubits. The two-redundancy group of qubits are entangled to the other two nodes in the shard, while the ancilla group of qubits is entangled to the node of the subsequent shard with the same (or closest) prefix. Thus, the ancilla qubits of node A1 (node A in shard 1) will be entangled to the ones of node A2 (node A in shard 2). Every node in the network has the following structure of qubits, with b qubits of data, b qubits of redundancy for one node of the shard, b for the other, and 2b of ancilla for the node outside its shard.

A1: $[\{d_{A1}\},\{r_{A1B1}\},\{r_{A1C1}\},\{a_{A1A2}\}]$
qubits structure: [data|redundancy1|redundancy2|ancilla]

To illustrate the entanglement procedure between nodes, let's depict the entanglement of the three nodes of shard 1 (A1, B1, C1).

A1: $[\{d_{A1}\},\{r_{A1B1}\},\{r_{A1C1}\},\{a_{A1A2}\}]$
B1: $[\{d_{B1}\},\{r_{B1C1}\},\{r_{B1A1}\},\{a_{B1B2}\}]$
C1: $[\{d_{C1}\},\{r_{C1A1}\},\{r_{C1B1}\},\{a_{C1C2}\}]$

Where $\{r_{A1B1}\}$, for instance, means that the redundancy qubits of A1 are entangled with the data qubits of B1, $\{r_{A1C1}\}$, redundancy qubits of A1 with C1 and so on.

Hence the two redundancy group of qubits of each node in the shard is entangled to the other two nodes, $\{r_{A1B1}\}$, $\{r_{A1C1}\}$, while the 2b ancilla qubits are entangled to the ancilla qubits of the node's counterpart in the next shard, $\{a_{A1A2}\}$. Following the 3-qubit bit flip error correction scheme in which the system is inspired (FIG. 2), 2b ancilla qubits are used in order to be able to detect not only errors on the data qubits, but also inconsistencies between the two redundancy qubits. This scheme enables the validation of any data exchanged using this quantum channel (that is, data communicated using the explained quantum mechanism). Whenever a node measures its data, the entangled qubits in other nodes will collapse, sending the corresponding information. Using this quantum transmission scheme is how data related to the consensus algorithms and validation information is exchanged.

For the case of a shard with 4 nodes, the entanglement structure is as follows:

A1: $[\{d_{A1}\},\{r_{A1B1}\},\{r_{A1C1}\},\{a_{A1A2}\}]$
B1: $[\{d_{B1}\},\{r_{B1C1}\},\{r_{B1D1}\},\{a_{B1B2}\}]$
C1: $[\{d_{C1}\},\{r_{C1D1}\},\{r_{C1A1}\},\{a_{C1C2}\}]$
D1: $[\{d_{D1}\},\{r_{D1A1}\},\{r_{D1B1}\},\{a_{D1C2/C2}\}]$

The entanglement structure follows the same scheme, every node in the shard is entangled through their redundancy qubits with two other nodes inside the shard, the main difference when a shard has four nodes lies in the entanglement with an external shard. If the next shard also has four nodes, the entanglement scheme followed is the same as in the three nodes case, so the ancilla qubits of the last node (D1) is entangled with its counterpart in the next shard (D1), $\{a_{D1D2}\}$. However, if the next shard has three nodes, the entanglement is performed with the nearest node inside the next shard, leading this node to have two external nodes entangled to it $\{a_{D1C2}\}$ and $\{a_{C1C2}\}$. In any case, this matter doesn't affect the correct operation of the rest of the proposed solution.

Consensus Layer

Over the aforementioned described quantum scheme, validation data is exchanged to reach consensus. This transmission layer for the exchange of validation message minimizes the delay and required bandwidth to reach consensus. In an embodiment, data exchanged using the data qubits of the quantum channels explained above, has the following datagram structure (this is only an option and any other datagram structures are possible). This datagram structure is the one sent on through the data qubits of the quantum scheme, such as $d_{A1}$:

Datagram structure: [(ID)|SEQ|RANDOM NUMBER|DATA]

ID is an optional field used to identify the specific consensus algorithm or blockchain platform to whom the data exchanged belongs. As it will be explained below, the quantum trust ring is designed to be used as an auxiliary independent security layer for isolated blockchain platforms, DLT systems, or quantum consensus, or a group of them (see for example FIG. 1).

SEQ is a sequence number that identifies the validation round for which the data is exchanged. This SEQ number may equal the hash of the previously validated round, preventing nodes from doing replay attacks (using previously sent validation data to forge some kind of information).

RANDOM NUMBER represents the random number used to determine the next node entitled to propose the next block in the blockchain platform (or in other words, the next data to be validated). In an embodiment, this random number is generated as follows:

when preparing the data qubits, every node dedicates some of these qubits to prepare a pure superposition state so that when the data is measured, these qubits collapse to a random number with a number of bits determined by the number of qubits prepared.

DATA is the specific validation data that wants to be exchanged with all the nodes of the network, or in other words, the data to which the consensus algorithm is to be applied. This data may be a block proposal (with the specific format of the overlaying blockchain platform), or any other data that wants to be shared within the DLT network and that therefore should be validated.

Thus, every node prepare their data qubits using the aforementioned datagram structure, where the fields ID, SEQ and DATA are prepared using pure states so that when they are measured the node knows it will collapse to the desired values they were prepared to, and the random number field is prepared in a superposition state, so this value is only known by the node (and all of its entangled counterparts) at the time of measuring (when it collapses to a specific random number).

Figure 4:
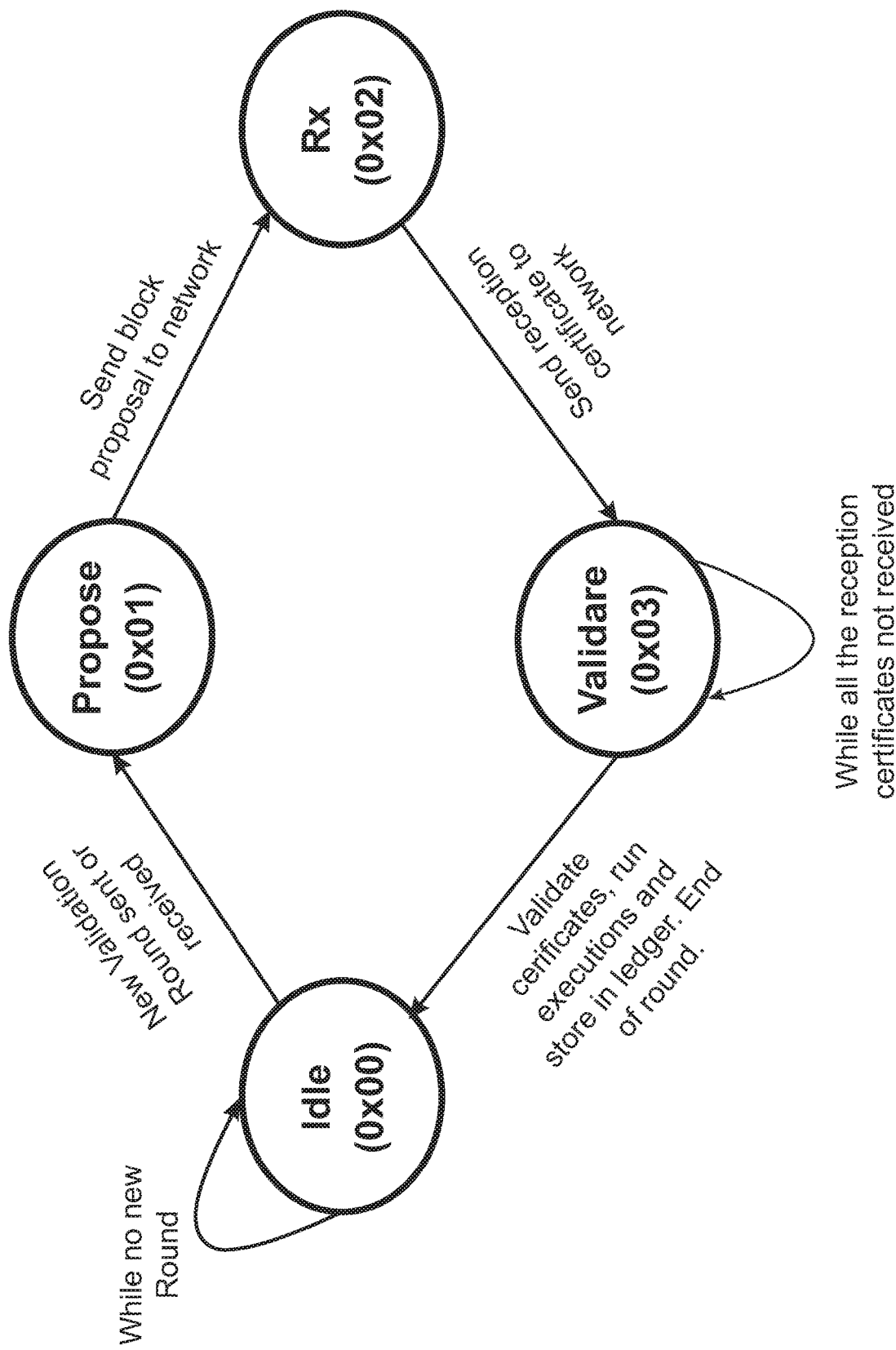
FIG. 4 shows a schematic diagram of the state machine for the operation of every nodes in order to reach consensus according to one embodiment of the invention.

In an embodiment, in order to reach consensus in the proposed quantum trust ring network, every node operates following the state machine described below (see FIG. 4):

Idle State (0x00): The ring stays in this state (idle) while no node in the network request a new validation round. Whenever a node wants to start a validation round, it sends a message using the classical channel (i.e. the classical transport protocol available for the communication between nodes).

The beginning of a new validation round is notified to the rest of nodes, and all the nodes switch from the idle state (0x00) to the propose state (0x01). That is, when a new validation rounds is sent or received by the nodes, they switch from the idle state (0x00) to the propose state (0x01).

Propose State (0x01): Nodes in this state prepare the state of their data qubits to send the data to the rest of the nodes. This is achieved as follows: every node prepares the 4b entangled qubits (being b the numbers of bits of the trusted data to be validated). This entanglement can be achieved using any known entanglement technique, for example, one of the techniques previously mentioned such as the use of "parametric down-conversion" sources of photons.

Then the data bits are prepared with the corresponding datagram that wants to be proposed by the node, and all the entangled qubits are shared by the node to all of its counterparts (that is, to the rest of nodes with which this node has entangled its qubits). Once entangled qubits are shared with every counterpart, each node measures its qubits forcing every redundancy and ancilla qubit to collapse to the same (quantic) states.

State Rx (0x02): When a node has received the data from all its entangled counterparts (i.e. all of its qubits have been measured), it builds a reception certificate. Reception certificates are used to share with the rest of the network the redundancy and ancilla data measured by a node, along with his own data. Thus, a reception certificate for a node An would have the following structure:

RxCertificate: ($\{d_{An}\},\{r_{AnBn}\},\{r_{AnCn}\},\{a_{AnA(n+1)}\}$)

Every node shares its reception certificate signed (to ensure its integrity) through the corresponding classical network transport layer. Hence, every node would send the following data structure signed with their private key: classical tx: {RxCertificate,hash(RxCertificate), sign$_{sAn}$[RxCertificate,hash(RxCertificate)]}

After this data is conveniently signed, a node moves to the next state 0x03.

Validate State (0x03): Nodes stay in this state until they receive the reception certificates from every computing node in the ring. Upon reception of a certificate, the node verifies its integrity and authenticity (through the certificate signature). After receiving every reception certificate, it validates using the ancilla and redundancy bits that no data was forged in the validation round. If everything is correct, the validation proposal from, for example, the node that resulted in the measurement of the smaller random number is the one selected to update the ledger and the state of the distributed network (usually all the nodes of the ring should validate the reception certificates received from every other node in order to commit data into the ledger). The validation of all the reception certificates is straightforward. If all the signatures where valid, reception certificates are unpacked in order to extract all the data related to data information, redundancy and ancilla. In order for the data exchanged in the validation round to be considered valid, the following equalities must hold for every data datagram:

$$d_{An}==r_{(\ldots)An}==a_{(\ldots)An1\{1\ldots b\}}==a_{(\ldots)An1\{b+1\ldots 2b\}}$$

That is, for every node, $A_n$, their data bits must be equal to the redundancy bits sent by its corresponding redundancy nodes (the other two nodes of the shard in case of a 3 nodes shard), and the first b bits, and the last b bits of the ancilla structure $a_{(\ldots)An1\{1\ldots b\}}, a_{(\ldots)An1\{b+1\ldots 2b\}}$ (recall from the 3-qubit error correction scheme that ancilla bits are conformed by 2b bits) must be also equal to the data bits. If during the validation process any of these equalities do not hold, it means data has been forged and the validation round is aborted for every node in the ring. At this stage, through the data in reception certificates, and using all the redundant information, if the forgery is obvious, instead of directly aborting the validation round, the forgery could be appropriately corrected, and keep operating as if there was not forgery.

Once reception certificates have been validated, every node may use the data with the smaller random number to update the ledger and run the pertinent executions. The identifier for the block, or network state update stored, may be the hash of the reception certificate of the winner node. This hash will be included in the SEQ field in the next validation round in order for nodes to be able to detect that no data has been modified, and that the reception certificate chosen in the previous round was correct. The storage of every winner reception certificate in each validation round allows for the synchronization of joining members to the ring, or future health-check validations of the whole network by its members or external entities.

For their operation, nodes may use a classical register where they store the state, they are in in the validation process so it can be requested any time by any node subsystem or overlaying protocol/application. Additionally, a timeout may determined for each state in every node, so that if a validation round gets stuck to much time in the same state (either because a node in the network hasn't make any validation proposal, or because a node doesn't receive every reception certificate in the network), the validation round can be aborted, or backup systems may be used to distribute the pending data for the stuck nodes. A failing node could easily sync to the ring by requesting to any of the members the history of all the winner certificates from every previous validation round.

High Level Infrastructure

Figure 5A:
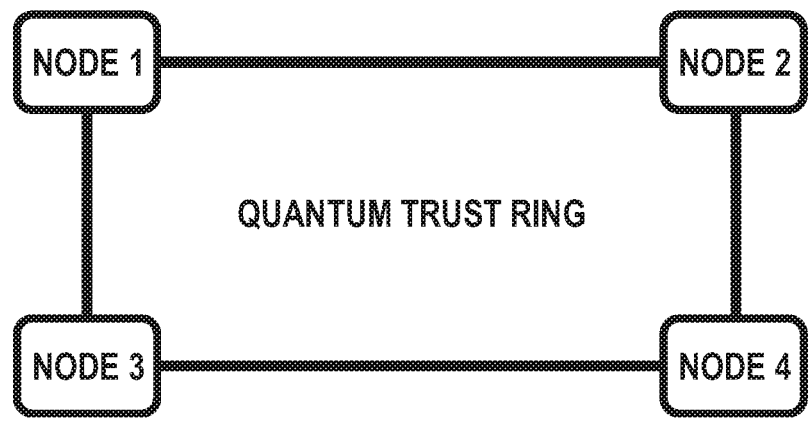
FIGS. 5a and 5b shows schematic examples of different Quantum Trust Ring supported configurations according to embodiments of the invention.
Figure 5B:
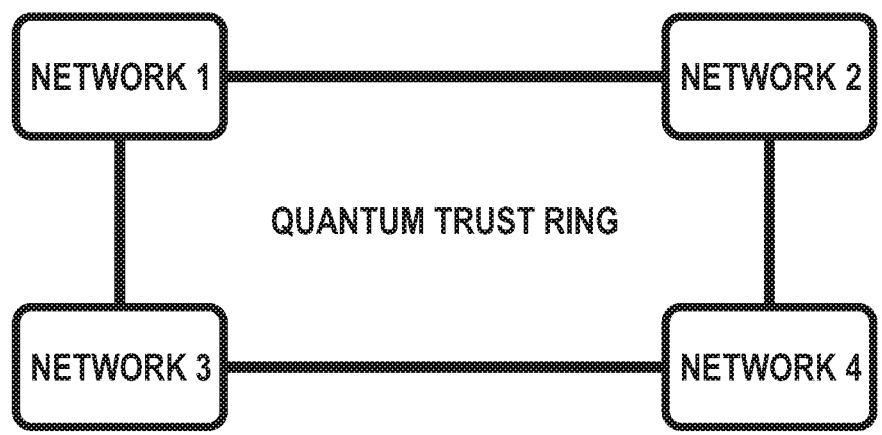

The quantum trust ring may be designed as an independent auxiliary network layer that may be implemented as a specific distributed network where the nodes of the quantum trust ring is formed by the nodes of the distributed network it gives service to (FIG. 5a, single network); or it can be implemented as an auxiliary infrastructure to give service to different distributed networks allowing them to leverage its enhanced security, trust, and performance. This way, different independent networks could use a quantum trust ring as auxiliary infrastructure for their operation (FIG. 5b, multiple networks).

The onboarding of new nodes to the quantum trust ring is immediate. According to its specific ID, the node is assigned a shard. According to its ID and shard, the corresponding entangled qubits required for its operation is shared with him and his counterparts. Before it can start participating in the system, the node needs to sync with the data of the previously validated rounds.

The operation of the quantum trust ring over the aforementioned configurations will be:

Single network (FIG. 5a): In the single network configuration, the quantum trust ring gives service to a single distributed network or consensus algorithm. Thus, all the messages exchanged in the ring belong to the same network. In this configuration, usually every block of the overlaying network is validated using the ring.

Multiple networks (FIG. 5b): In this configuration, each network may be using his own consensus algorithm. They may choose to validate all of its data through the quantum ring, or if they only have a limited number of quantum nodes connected to the trust ring, they may prefer to only use the quantum ring for the validation of certain blocks. Thus, whenever a node in one of the networks wants to trigger a validation round in the quantum ring, it will send a "request validation" message to the quantum node assigned to its network. The quantum ring would perform the validation process and return the validated block to the network. Every node in the ring stores the specific blocks validated in it so that nodes in the networks making use of it can request the winner reception certificates to validate that the blocks returned by their assigned quantum node assigned was correct. In this configuration the quantum ring may be seen as a parallel consensus module or transport layer from which connected networks can leverage its security and performance when desired.

Some embodiments of the quantum trust ring solution proposed in the present patent application, have been presented above. However, other embodiments can be implemented within the scope of the proposed solution, implementing different (usually stronger) stronger levels of security over the above proposed solution.

For example, instead of using shards with three or more nodes or forcing the entanglement of every node inside a shard, if more qubits were available per node, additional entangling schemes can be designed inspired in other quantum error correction algorithms other than the 3-qubit bit flip algorithm selected for the invention. Furthermore, the entangling scheme and validation could be generalized through the use of quantum stabilizers instead of only using the simple 3-qubit error correction scheme.

On the other hand, the consensus algorithm implemented over the quantum channel proposes a general framework that may be easily improved for specific use cases. A general datagram structure has been proposed but it could be easily extended for other use cases. Additionally, new topologies and configurations inspired in the two high-level architectures proposed in the invention could be easily implemented.

Finally, it is important to point out, that the proposed solution does not imply the use of any specific protocol, transport layer or cryptographic system for the communication through the classical link. In other words, any communications protocol, transport layer or cryptographic technique could be used for the exchange of reception certificates in the proposed invention.

The proposed solution has been presented here according to several embodiments, but of course, several alternative implementations of this architecture are supported according, for example, to the specific underlaying DLT platforms connected to it. In other words, although the present invention has been described with reference to specific embodiments, it should be understood by those skilled in the art that the foregoing and various other changes, omissions and additions in the form and detail thereof may be made therein without departing from the scope of the invention as defined by the following claims. Furthermore, all examples recited herein are principally intended expressly to be only for pedagogical purposes to aid the reader in understanding the principles of the invention and the concepts contributed by the inventor(s) to furthering the art and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for enhancing consensus between a group of computing nodes belonging to the same or different Distributed Ledger Technology, (DLT), networks connected by a telecommunications network, the method comprising the following steps:

a) a computing node requesting a validation round;

b) when the validation round is requested, every computing node of the group obtaining quantum bits, data qubits, corresponding to b data bits to be validated in the validation round;

c) every computing node of the group, entangling its data qubits with one or more computing nodes of the group and validating the data bits based on the entangled data qubits from one or more other computing nodes of the group, according to a quantum error correction scheme;

wherein step c) comprises:

every computing node of the group, obtaining a sequence of qubits entangled with data or ancilla qubits of other computing nodes, counterpart nodes, according to the quantum error correction scheme;

every computing node of the group, measuring the sequences of entangled qubits to obtain the corresponding bits and sending a reception certificate, including the measured bits together with the computing node data bits to be validated, to the rest of computing nodes of the group using one or more telecommunications network channels;

when receiving the reception certificates, every computing node of the group, validating the data bits according to the quantum correction scheme based on the information received on the reception certificates;

if any of the validations is negative, considering the validated data as forged.

2. A method according to claim 1, where the quantum error correction scheme is a 3-qubit error-correction scheme.

3. A method according to claim 1 where step c) comprises:
assigning each computing node of the group to a shard, being N the total number of shards;
every computing node ($A_n$) of each shard n, n=1 ... N, preparing the following groups of entangled qubits:
a first redundancy group of b qubits entangled with the data qubits of a computing node ($B_n$) of the same shard n,
a second redundancy group of b qubits entangled with the data qubits of another computing node ($C_n$) of the same shard n, and
a group of 2b ancilla qubits entangled with the ancilla qubits of a computing node $A_{n+1}$ belonging to a different shard;
every computing node of each shard, measuring the sequences of entangled qubits to obtain the bits corresponding to each qubit;
every computing node of each shard, building a reception certificate which includes the b computing node data bits to be validated, $dA_n$, the bits corresponding to the measurement of the a first redundancy group of b qubits $\{r_{AnBn}\}$, the bits corresponding to the measurement of the second redundancy group of b qubits $\{r_{AnCn}\}$ and the bits corresponding to the measurement of the group of 2b ancilla qubits $\{a_{AnA(n+i)}\}$;
every computing node of each shard, sending said reception certificate to the rest of computing nodes of the group through one or more channels of the telecommunication network;
every computing node of each shard, validating the b computing node data bits $dA_n$ from the information in the received reception certificates, and if any of the validations is negative, considering the data to be validated as forged.

4. A method according to claim 3, where the validation of the computing node data bits, $dA_n$, in every computing node $A_n$ is positive if:

$$d_{An} == r_{(\ldots)An} == a_{(\ldots)An1\{1\ldots b\}} == a_{(\ldots)An1\{b+1\ldots 2b\}}$$

being $r_{(\ldots)An}$, the redundancy bits received from its corresponding counterpart computing nodes from the same shard n ($B_n$, $C_n$) and being $a_{(\ldots)An1\{1\ldots b\}}$ the first b bits, and $a_{(\ldots)An1\{b+1\ldots 2b\}}$ the last b bits of the ancilla bits received form its counterpart node from other shard ($A_{n+1}$).

5. A method according to claim 3, where the number of shards is the whole part of N/3 and every shard has a minimum of three computing nodes assigned.

6. A method according to claim 1, where the method further comprises:
if all the validations are positive, selecting in each computing node one of the validated data to update a corresponding ledger; otherwise, considering the data as forged and aborting the validation round or from the information received in the reception certificates, correcting the forgery and recovering the data.

7. A method according to claim 1, wherein the reception certificates are signed by the computing node building the reception certificate and the validation is performed, only if the integrity and authenticity of the reception certificate is checked through the reception certificate signature.

8. A method according to claim 1, wherein the validation is performed by a computing node only if it has received a reception certificate from all the computing nodes of the group.

9. A method according to claim 1 where the b data bits to be validated include the following fields:

[SEQ|RANDOM NUMBER|DATA]

where SEQ is a sequence number that identifies the validation round for which the data is exchanged, RANDOM NUMBER is a random number used to determine the next computing node entitled to propose the next data to be validated and DATA is the specific information about which consensus is to be established between the computing nodes of the group.

10. A method according to claim 9 where the datagram also includes an identification field, (ID), where said identification field used to identify the specific consensus algorithm or blockchain platform to whom the data exchanged belongs.

11. A method according to claim 9 where SEQ number equals the hash of the previously validated round.

12. A system for enhancing consensus between computing nodes, the system comprising a group of computing nodes belonging to the same or different Distributed Ledger Technology, (DLT), networks connected by a telecommunications network, every computing node comprising:
mean for requesting a validation round sending a message through the telecommunications network;
mean for, when a validation round has been requested obtaining the quantum bits, data qubits, corresponding to the b data bits to be validated in the validation round;
mean for entangling its data qubits with one or more computing nodes of the group, following a quantum error correction scheme and
a processor configured to validate the b computing node data bits using the quantum error correction scheme based on the entangled data qubits from one or more other computing nodes of the group, according to the quantum error correction scheme;
wherein the computing nodes of the system further comprise:
means for obtaining a sequence of entangled qubits by entangling qubits with data or ancilla qubits of other computing nodes, counterpart nodes, according to the quantum error correction scheme;
means for measuring the entangled qubits to obtain the corresponding bits;
means for sending a reception certificate, including the measured bits together with the computing node data bits to be validated, to the rest of computing nodes of the group using one or more telecommunications network channels;
means for receiving reception certificates from the rest of computing nodes of the group,
the processor being configured to validate the b data bits according the certain quantum correction scheme based on the information received on the reception certificates and, if any of the validations is negative, to classify the validated data as forged.

13. A non-transitory digital data storage medium for storing a computer program which comprises instructions causing a computer executing the program to perform the method according to claim 1.

* * * * *